United States Patent
Helbig et al.

(10) Patent No.: US 8,770,888 B2
(45) Date of Patent: Jul. 8, 2014

(54) WATERING MAT FOR THE LARGE-AREA DISTRIBUTION OF WATER

(75) Inventors: Reinhard Helbig, Oberlungwitz (DE); Rolf Arnold, Dresden (DE); Dietmar Konrad Haub, Bad Camberg (DE); Thomas Roess, Twistringen (DE)

(73) Assignee: IGG-Internationale Geotextil Gesellschaft mbH, Twistringen (DE)

( * ) Notice: Subject to any disclaimer, the term of this patent is extended or adjusted under 35 U.S.C. 154(b) by 664 days.

(21) Appl. No.: 12/671,475

(22) PCT Filed: Feb. 12, 2008

(86) PCT No.: PCT/EP2008/051657
§ 371 (c)(1), (2), (4) Date: Jul. 6, 2010

(87) PCT Pub. No.: WO2009/015911
PCT Pub. Date: Feb. 5, 2009

(65) Prior Publication Data
US 2010/0282859 A1  Nov. 11, 2010

(30) Foreign Application Priority Data

Jul. 30, 2007 (DE) .......................... 10 2007 036 018

(51) Int. Cl.
*A01G 25/00* (2006.01)
*A01G 27/00* (2006.01)

(52) U.S. Cl.
USPC ............................. 405/37; 700/284; 239/63

(58) Field of Classification Search
CPC .......................... A01G 25/06; A01G 2025/003
USPC .............. 405/36–38, 50; 700/284; 239/11, 63
See application file for complete search history.

(56) References Cited

U.S. PATENT DOCUMENTS

| | | | | |
|---|---|---|---|---|
| 4,216,789 A | * | 8/1980 | Hasenbeck | 137/78.3 |
| 4,545,396 A | * | 10/1985 | Miller et al. | 137/78.3 |
| 5,133,151 A | * | 7/1992 | Blok | 47/64 |

(Continued)

FOREIGN PATENT DOCUMENTS

| | | |
|---|---|---|
| DE | 2019423 | 2/1972 |
| DE | 2525114 | 12/1976 |

(Continued)

OTHER PUBLICATIONS

International Search Report, mailed Jan. 27, 2009, for PCT/EP2008/051657, 5 pages.

(Continued)

*Primary Examiner* — John Kreck
*Assistant Examiner* — Stacy Warren
(74) *Attorney, Agent, or Firm* — Seed IP Law Group PLLC (57) ABSTRACT

A watering mat is provided for the large-area distribution of water, particularly in horticulture and landscaping as well as agriculture. The watering mat includes a first and a second carrier layer to accommodate other elements of the watering mat, one or more connections for connecting the first and the second carrier layers, one or more water-feeding elements arranged between the first and the second carrier layers for feeding water into the watering mat and distributing water through the watering mat, an absorption layer for water storage arranged between the first and the second carrier layers and a moisture level detector in the watering mat.

28 Claims, 2 Drawing Sheets

(56) References Cited

U.S. PATENT DOCUMENTS

| | | | |
|---|---|---|---|
| 5,174,231 A * | 12/1992 | White | 112/420 |
| 5,839,659 A * | 11/1998 | Murray | 239/1 |
| 5,938,372 A * | 8/1999 | Lichfield | 405/38 |
| 6,178,691 B1 * | 1/2001 | Caron et al. | 47/79 |
| 6,401,742 B1 | 6/2002 | Cramer et al. | |
| 6,712,552 B1 * | 3/2004 | Kepler et al. | 405/37 |
| 6,996,932 B2 | 2/2006 | Kruer et al. | |
| 7,203,576 B1 * | 4/2007 | Wilson et al. | 700/284 |
| 7,392,614 B2 * | 7/2008 | Kruer et al. | 47/48.5 |
| 7,647,724 B2 | 1/2010 | Caron et al. | 47/1.01 R |
| 2005/0072862 A1 * | 4/2005 | Skinner | 239/542 |
| 2006/0201061 A1 * | 9/2006 | Caron et al. | 47/79 |
| 2007/0243019 A1 * | 10/2007 | Baker | 405/36 |

FOREIGN PATENT DOCUMENTS

| | | |
|---|---|---|
| DE | 3238073 | 12/1983 |
| DE | 283008 | 9/1990 |
| DE | 4037396 | 5/1991 |
| DE | 4024405 | 2/1992 |
| DE | 19933554 | 1/2001 |
| DE | 10118643 | 10/2002 |
| EP | 1308085 A2 | 5/2003 |
| FR | 2471740 | 6/1981 |
| GB | 2199474 A | 7/1988 |
| JP | 54-097433 U | 12/1952 |
| JP | 47-033244 Y | 10/1972 |
| JP | 63-169918 A | 7/1988 |
| JP | 07-087857 A | 4/1995 |
| JP | 7-222533 A | 8/1995 |
| JP | 09-191780 A | 7/1997 |
| JP | 2000-144749 A | 5/2000 |
| JP | 2001-333643 A | 4/2001 |
| JP | 2002-088763 A | 3/2002 |
| WO | 02/082888 | 10/2002 |
| WO | 2007/053862 | 5/2007 |

OTHER PUBLICATIONS

Written Opinion, mailed Mar. 4, 2010, for PCT/EP2008/051657, 10 pages.

* cited by examiner

WATERING MAT FOR THE LARGE-AREA DISTRIBUTION OF WATER

BACKGROUND

1. Technical Field

The present disclosure relates to a watering mat for the large-area distribution of water, particularly in horticulture and landscaping as well as in agriculture, comprising one first and one second carrier layer to accommodate elements of the watering mat, one or more connections for connecting the first and the second carrier layer, one or more water-feeding elements arranged between the first and the second carrier layer for feeding water into the watering mat and distributing water through the watering mat, and one absorption layer for water storage arranged between the first and the second carrier layer.

2. Description of the Related Art

When in the following the term water is used, it is meant to include in addition to water also mixtures that are predominantly based on water but can also contain constituent portions of other substances such as nutrients, vitamins, or trace elements. These substances may be present in dissolved or undissolved form.

Various irrigation systems are known in the field of horticulture that are designed specifically for use in green-house applications, allow a very precise metered application, and as a result possess a comparatively complicated design. For example, DE 20 19 423 A describes an irrigation device for plants in planters or other vessels, which possesses a special pressure compensating feature to facilitate a uniform water discharge even on uneven surfaces.

Disclosed in DE 199 33 554 A1 is a below-ground supply system for the large-area watering of cultivated planted areas, in which elastic hoses equipped with discharge outlets with valve-like action are installed below ground in the agrarian area and are connected to a water supply system. These are used to continuously provide moisture to the ground zones adjoining the hoses above and below using a metered water-feeding system. For this, the individual hoses are arranged with a spacing of approximately 60-70 cm and at a depth of approximately 30-60 cm below ground and on both sides are connected to comb-shaped pipes, which also are installed below ground and are supplied with water. For this particular supply system, arranging the irrigation hoses for a large-area application is very costly in terms of both time and money.

DE 101 18 643 describes a textile watering mat for the large-area distribution of water, preferably in the below-ground region of a horticulture or landscaping installation. In this watering mat, watering hoses are arranged at certain intervals between two webs of fleece material with water-conducting capability. The watering mat can be manufactured at low cost and is easy to install. A drawback is that for regulating the ground moisture one has to employ external measuring devices, such as for example tensiometers. When irrigating large areas, this results in unacceptably high costs. For this reason, the water feed is usually adjusted in accordance with experience values, which in unfavorable cases can lead to undesired seepage losses, or to dry soil, e.g., given extreme levels of sunshine. Furthermore, in some regions it is possible that the salt content in the ground acts together with the capillary action of a ground layer to cause salt accumulation in the watering mat. It is generally known how to disrupt the ground capillary action using a capillary barrier, e.g., in form of a gravel layer. This solution is only feasible in special cases on account of the poor availability of the material and the associated high costs. The watering mat of DE 101 18 643 possesses a comparatively high water-storage capacity due to the existing webs of fleece material with filler strips located in between. To further enhance the water-storage capacity, an increase in the buffer-storage characteristics would be desirable. Employing thicker webs of fleece material can not solve this problem on account of the associated costs.

BRIEF SUMMARY

Embodiments of the present invention eliminate the above-mentioned disadvantages and make available a cost-effective watering mat for large-area applications, which in order to ensure a uniform moistening of the adjacent ground sections, possess in comparison to known solutions a higher water-storing capacity and offer protection against salt accumulation in the watering mat.

Various embodiments of the present invention provide means for detecting the moisture level in the watering mat. Detecting the moisture level makes it possible to regulate the water feed into the watering mat in such a manner that the mat neither dries out nor is charged with too much water. If the watering mat dries out, the plants that it supplies with water could also suffer from a lack of water, which could lead to reduced harvest yields or, as a worst-case scenario, to these plants dying off Charging the watering mat in excess of the maximum water-uptake capacity of the ground can lead to waterlogged soil, which might lead to rotting of the corresponding plants. Furthermore one would face seepage losses, i.e., the water conducted into the ground would not be used optimally for ground watering. The ability to detect the moisture level in the watering mat allows the operator to avoid problems of this nature.

An advantageous further development of some embodiments of the invention is characterized in that the means for detecting the moisture level in the watering mat are arranged between the first and the second carrier layer. No additional work steps are required for installing the means; rather they are installed in the same operation together with the watering mat. This prevents additional costs from being incurred and ensures that the means are distributed in a manner so that the determination of the moisture level across the entire watering mat is reliable and representative. It also precludes the formation of zones within the watering mat, in which the moisture level deviates significantly from the moisture level measured by the means. An incorrectly dosed feed of water can consequently be avoided.

In an advantageous further development of some embodiments of the invention the means for detecting the moisture level of the watering mat are embodied as sensor wires. These sensor wires can for example comprise low-voltage cables, which essentially consist of two metal wires, in particular tin-coated copper wires, which are arranged—insulated relative to each other—in the carrier layer or in the absorption layer. The conductivity or resistance between the copper wires changes in dependence on the moisture level, and each particular change can be assigned to a respective moisture level. A sensor wire of this type is described in more detail in DD 283 008 A5. It is very flexible, which is why its use is particularly practical if tight radii are present, as is the case in a rolled-up watering map or if sudden changes in direction or elevation due to the nature of the area to be irrigated are encountered. The use of sensor wires of this type reduces the risk of a cable break during installation, which would lead to impaired operating capability of the means for detecting the moisture level and of the watering mat itself. In order to be able to ensure a reliable detection of the moisture level, corrosion of the employed metal wires must be prevented. Corrosion alters the surface characteristics of the metal wires, resulting in a change in their conductivity, so that the measured values will no longer correspond to the original moisture levels. Metal wires that have corroded through completely can no longer be used to determine the moisture level. For the purpose of being able to prevent or at least reduce corrosion of the employed wires, a suitable sheathing may be provided, which serves to protect the metal. Further, the wires may be subjected to an anti-corrosive surface treatment, e.g., tin-coating.

In an advantageous further development of some embodiments of the invention the means for detecting the moisture level in the watering mat comprise moisture sensors and the associated wiring. For this one can employ all moisture sensors of the known type, but preferably those that output the measured moisture level in electronically recordable form, such as for example capacitive moisture sensors. According to some embodiments of the invention, these sensors together with the associated wiring are installed and cabled in the watering mat prior to the installation of the latter. No subsequent cabling is required. After the installation of the watering mat it is only necessary to connect the moisture sensors to suitable display and/or control units for the moisture level.

In an advantageous further development of some embodiments of the invention the carrier layer is constructed of water-conducting materials, in particular textiles such as non-woven fabrics. Aside from textiles, the water-conducting materials can also include glass fiber or mineral cotton. One of several advantages of using water-conducting textiles for watering mats is that in comparison to glass fiber and mineral cotton they are characterized by better environmental compatibility and lower purchase costs. Moreover, textiles are flexible, which means they can easily adapt to the characteristics of the terrain, in which the watering mat is to be installed. Furthermore, the watering mat is easily rolled up, which reduces the space required for storage and transport of the watering mat. The water-conducting capability ensures that the water, which is conducted into the watering mat through the water-feeding elements, is distributed uniformly within the watering mat, and that the moisture level is kept nearly constant independent of local withdrawal variations. Furthermore, the water-conducting materials possess a certain water-storing capacity, allowing compensation for variations in both the water supply and the moisture level of the adjacent ground. The use of non-woven fabrics in irrigation technology has proven particularly advantageous, in particular if the non-woven fabric used is manufactured from rot-resistant, synthetic fiber material, since in comparison to other water-conducting materials, non-woven fabric materials exhibit a higher water-storing capacity.

In an advantageous further development of some embodiments of the invention, the connections are embodied in a seam-like fashion. These connections can be created for example using a stitch-bonding process, by needling, gluing, or other bonding processes. During this the water-feeding elements are enclosed tightly in order to prevent slipping. In contrast to metal connections, e.g., clips or clamps, this type of connection possesses a certain degree of flexibility, so that the overall flexibility of the watering mat is maintained. Moreover, this does not create any sharp corners, so that the water-feeding elements or the carrier layers are not damaged, particularly during installation of the watering mat. Moreover, these connections are not susceptible to corrosion, so that they reliably can withstand the moist ground environment even for longer time periods.

It is further preferred that the absorption layer be embodied as an absorbent fiber bed. In this manner, the water-storing capacity of the watering mat is further increased at low cost. Increased water-storing capacity is desirable in order to enhance the buffer effect of the watering mat, so that variations in both the water supply and the moisture level of the adjacent ground can be compensated for. High water-storage capacity is of advantage particularly in regions that have very little rainfall in the summer and consequently have enacted water restrictions, which complicate or prohibit supplying an adequate amount of water into the watering mat. Given a high water-storing capacity, the watering mat can be charged with water in a forward-looking manner, so that dry spells can be overcome at least partially, thus minimizing the risk of dried-up plants, reduced harvest yields, or a complete harvest loss.

Particularly for these reasons, the absorption layer and/or the fiber bed in an advantageous further development of some embodiments of the invention contain superabsorbent polymers to increase the water-storing capacity. Superabsorbent polymers consist for example of modified polyacrylates and can store an amount of water weighing 100 to 1000 times their own weight. These superabsorbent polymers may be present as granulated material, which swells in the ground to form gel particles (hydrogel) and stores water in the process. The plant roots can grow right through the gel particles and can withdraw water from them.

It is practical if the water-feeding elements of some embodiments of the invention are embodied as flat hoses. The use of flat hoses is of interest particularly if the overall height of the watering mat is a concern. The decreased overall height reduces the required storage space and facilitates the transport to the site of application.

Moreover, this can reduce the amount of material that must be excavated for the installation of the watering mat, which reduces installation costs.

In a particularly preferred further development of some embodiments of the invention it is intended that the water-feeding elements are embodied as a perforated irrigation hose or soaker hose, and are connectable to a water supply system. Embodying the water-feeding elements as perforated irrigation hoses facilitates a simple and cost-effective water discharge into the watering mat. Diameter, shape, and number of the perforations can be adapted without problems to the expected water requirements and the pressure drop in the hose. In particular, it is possible to take into consideration the quality or purity of the supplied water. If for example water is withdrawn from a river, the water may contain a large number of particles that could rapidly block perforations with small diameter. Through a suitable customization of the diameter of the perforations one can in general avoid a complicated and costly filtration step for the water. Moreover, it is possible to specify the positions of the perforations within the water-feeding elements. Depending on the characteristics of the existing soil and the plants to be watered, a uniform distribution of the perforations along the circumference of the irrigation hoses may be practical. The irrigation hoses commonly employed possess perforations that are arranged in pairs facing each other across 180°, however the embodiment of the arrangement or number of perforations may be different. Their orientation in the watering mat is a product of chance, but for specific applications the orientation of the perforations can be fixed precisely. To supply water, the hose ends may be connected directly to the existing water supply system without the need for a complicated installation of under-ground pipe systems. The water supply system may be an existing public utility system but it is also possible to connect to decentralized pump systems, for example if the water is obtained from a nearby lake or river.

In an advantageous further development of some embodiments of the invention, the water-feeding elements comprise trickling filters for water discharge. The discharge of water by means of trickling filters only commences at a specific water pressure. The water remaining after separation of the water-feeding elements from the water supply system remains in the water-feeding elements, without any slow draining taking place. This allows a more precise control over the moisture level in the watering mat, since it is ensured that after separation of the water-feeding elements form the water supply system no further water is discharged into the watering mat. In an embodiment variant without trickling filters, the water remaining in the water-feeding elements would be released at a low pressure and at small volume predominantly into the ground section below the watering mat, unless countermeasures are put in place. But this is precisely the section that only has minor significance for plant growth. Thus the water would not be used effectively. Consequently, the use of trickling filters not only serves to better control the moisture level but also represents a measure to ensure a more effective use of the existing water.

A particularly preferred further development of some embodiments of the present invention is characterized in that the water-feeding elements are embodied in a line shape with absorbent textile sheathing. A water-feeding element of this type can be manufactured with little expense, provides good irrigation action while simultaneously featuring low water consumption, and prevents blocking of the perforations. Furthermore, the absorbent design of the textile sheathing allows for water discharge to take place continuously along the entire length of the water-feeding element. A water-feeding element of this type is described for example in DE 40 37 396 C2.

It is further advantageous if the water-feeding elements and/or the means for detecting the moisture level are detectable using a detector. For this purpose, the water-feeding elements and the means for detecting the moisture level may be equipped with foil, e.g., metal foil, which can be detected by a suitable detector, such as a metal detector. Consequently, the position of the water-feeding elements and means for detecting the moisture level can even be determined when the watering mat is installed below ground. In the event that after installation of the mat construction work is to be performed in the ground region, be that the excavation of holes for new plants or the redesign of a golf course, particularly a re-alignment of the green including the hole, then it is possible to determine in advance whether the intended construction work could possibly damage the water-feeding elements and/or the means for detecting the moisture level.

In an advantageous further development of some embodiments of the present invention, filler strips are provided for the lateral immobilization of the water-feeding elements between the carrier layers and as height adjustment between the water-feeding elements and the carrier layers. As filler strips one may employ strips of fleece material, felt strips, textile threads, rope-like material, or a substrate, such as a peat layer. Although the connections already exert an immobilizing effect on the water-feeding elements, the filler strips can be adapted to the particular shape of the water-feeding elements used, for example by means of complementary recesses, which improves the positional hold and prevents non-uniform loading of the connections. For this purpose it is practical if the filler strips are embodied with less elasticity than the absorption layer, so that they are less compressed by any exerted loads. This makes it possible to prevent undulation, which otherwise could be generated by the different compression of the absorption layer and the water-feeding elements, ensuring a level installation of the watering mat.

In an advantageous further development of some embodiments of the invention, the second carrier layer possesses a water-impermeable outside surface. According to some embodiments of the invention, the outside surface is the side of the watering mat that faces away form the earth's surface. Generally it is intended to moisten the ground region located above the watering mat, since the plants to be watered are located primarily in this region. Having a water-impermeable outside surface of the second carrier layer prevents water from being conducted into the ground region located below the watering mat. This prevents seepage losses, so that the employed water can be used more efficiently.

A further aspect of some embodiments of the invention relates to a capillary barrier to prevent salt accumulation in the watering mat. The ground soil in some regions possesses a high salt content. Over the long term, the capillary action of the ground causes salt to accumulate in the watering mat. One of the results of this would be that the water delivered by the watering mat into the surrounding soil would also carry an increased salt content, even if the water supplied to the watering mat was nearly salt-free. A possible result is that the plants to be watered are damaged by the elevated salt content and could possibly die off. A further result can be the formation of a salt crust at the surfaces of the watering mat or at the water-feeding elements, so that discharge of water into the adjacent soil is inhibited or even blocked. Although providing a water-impermeable layer also serves to reduce the salt accumulation in the watering mat, the use of a capillary barrier has several advantages: The capillary barrier disrupts the capillary action of the ground but itself remains water-permeable. This prevents seeping water from accumulating in the ground region above the watering mat, which could lead to water-logged soil. If a water-impermeable layer is present at the lower side of the watering mat then any salt accumulation or salt crusts forming in the watering mat will only be inadequately removed by even heavy flushing, since the water can only exit from the watering mat on one side. The use of the capillary barrier according to some embodiments of the invention avoids this problem.

In an advantageous further development of some embodiments of the invention the capillary barrier is arranged below the second carrier layer and is fastened to the watering mat via the connection. In this manner the capillary barrier can be integrated into the watering mat and no additional operation is required for assembly. This represents a great advantage in comparison to the state of technology, since the capillary barrier is usually embodied in the form of a gravel layer. However, providing a gravel layer is associated with very high costs in terms of material and installation. Using the already present connections to attach the capillary barrier to the watering mat contributes to its simple design and production, so that the costs that are incurred by providing the capillary barrier are kept low.

An advantageous further development of some embodiments of the invention is characterized in that the capillary barrier is embodied as a root-anchoring mat. A root-anchoring mat is a three-dimensional geotextile that can be purchased easily and cheaply. It effectively interrupts the capillary action of the ground and can be attached to the watering mat particularly easily. The dimensioning of the root-anchoring mat can easily be adapted to the ground characteristics.

In a preferred further development of some embodiments of the present invention, the capillary barrier is fashioned out of flexure-resistant fibers and/or textile scraps and is surrounded by a net-like structure. In this manner the capillary barrier can be manufactured in a very simple manner. It is not necessary to form a continuous layer but rather it is possible to use discontiguous fibers or textile scraps, which for example are left over as remnants during textile production, without the need to align these in any way. The netted structure can also be composed of leftover fabric remnants or of other fibers. This provides a contribution to sustainability and further reduces the manufacturing costs of the watering mat.

In an advantageous further development of some embodiments of the invention, the water-feeding elements are embodied in a manner so that they can be used to feed gases into the watering mat. A prerequisite for this is that the employed water-feeding elements are manufactured from a material that is itself gas-proof, so that charged gas only exits at the intended locations. In addition, the hose connections must be selected so that the water-feeding elements can be connected to a gas supply system in a gas-proof manner. Introducing gas into the watering mat has the general effect of loosening the soil in the vicinity of the watering mat, which improves the aeration of the soil from the surface. This also counteracts the formation of water-logged soil and aids root growth. With the help of the gas feed, the watering mat can be dried in certain time intervals, which for example counteracts the formation of mold and prolongs the service life. Furthermore, this adds the capability to be able to free blocked perforations not only with water but also with gas. When introducing air into the watering mat, the soil will be aerated from below, which is beneficial to the plants. By introducing appropriate gases it becomes possible to kill germs or pests in the soil. It is possible to use some water-feeding elements to feed water, while in parallel using others to feed gas into the watering mat and consequently into the adjacent ground sections.

Gas-feeding elements for feeding gas into the watering mat represent an advantageous further development of some embodiments of the invention. In this case, the watering mat possesses two different feeding elements, one for gas and one for water. This means that the feeding elements can be optimized specifically for the fed fluids. A parallel feed of water and gas into the watering mat is possible. The above-mentioned advantages of a gas feeding capability apply in this case equally.

An advantageous further development of some embodiments of the invention is characterized by empty pipes for changing the configuration of the watering mat. Changes to the configuration of the watering mat may for example involve a change in the number of the water-feeding elements during the course of the operation or shutting down some water-feeding elements to use different ones. A further configurational change may be a subsequent installation of sensor lines in the watering mat, either as replacement for old sensor lines, or for the measurement of other quantities that have been found to be relevant during the course of the operation.

It is also advantageous to provide a measuring apparatus to determine the salt content of the water supplied to the watering mat. As already indicated above, salt accumulation can lead to blockages in the watering mat, resulting in compromised operational capability. Moreover, too high a salt content damages the plants. Given the capability of determining the salt content of the supplied water, the formation of such salt accumulation and damage to the plants can already be counteracted in advance by only supplying water with an acceptable salt content to the watering mat.

Depending on the employed method, the salt content can also affect the determination of the moisture level in the watering mat, for example when employing the above-described sensor lines that determine the moisture level by way of a conductivity measurement. In this case, the value determined for the moisture level has to be corrected by a factor that is dependent on the salt content of the supplied water. Problems may arise in particular if the salt content is variable. Consequently, a precise determination of the moisture level is only possible if the salt content of the supplied water is known.

A further aspect of some embodiments of the present invention relates to an irrigation system for a more efficient use of the water employed for watering ground sections, particularly in horticulture and landscaping, comprising:

a watering mat for the large-area distribution of water, whereby the watering mat comprises means for detecting the moisture level in the watering mat, an input unit to input information relating to the operation of the watering mat, a delivery device for feeding water into the watering mat, a measuring apparatus to determine the salt content of the water supplied to the watering mat, a measuring device to determine the quantity of water supplied to the watering mat, a further measuring device for measuring weather related data, and an output unit to output information relating to the moisture level in the watering mat and the salt content of the water supplied to the watering mat, as well as of weather-related data, and a control unit for documenting and processing data received from the means, the measuring apparatus, the measuring device, and the further measuring device, and for generating control signals to control the output unit and the delivery device.

An advantageous further development of the irrigation system according to some embodiments of the invention is a transmission unit for transmitting to a receiving station the data received by the control unit for documenting and processing purposes from the means, the measuring apparatus, the measuring device, the further measuring device, and control signals generated by the control unit for controlling the output unit and the delivery device.

A further aspect of some embodiments of the invention relates to a method for a more efficient use of the water used for watering ground sections, particularly in horticulture and landscaping as well as agriculture, comprising the following steps:

large-area distribution of water by means of a watering mat, inputting information relating to the operation of the watering mat by means of an input unit, detecting the moisture level in the watering mat with the help of means, feeding water into the watering mat by means of a delivery device, determining the salt content of the water supplied to the watering mat by means of a measuring apparatus, determining the quantity of water supplied to the watering mat by means of a measuring device, measuring weather-related data by means of a further measuring device, documenting and processing the data received from the means, the measuring apparatus, the measuring device, and the further measuring device, by means of a control unit, and generating control signals by means of the control unit to control a output unit and the delivery device.

The method according to some embodiments of the invention is further developed by transmitting to a receiving station the data received by the control unit for documenting and processing purposes from the means, the measuring apparatus, the measuring device, and the further measuring device, and the control signals generated by the control unit for controlling the output unit and the delivery device.

A further aspect of some embodiments of the invention relates to a control system for the more efficient use of the water used in the irrigation of ground sections, particularly in horticulture and landscaping as well as agriculture, comprising program means to prompt a computer to carry out the following steps when a computer program is executed on the computer:

processing the information received from an input unit, a measuring apparatus, a measuring device, and a further measuring device, whereby the information obtained from the input unit relates to the operation of the watering mat, the information received from the measuring apparatus relates to the salt content of the water fed to the watering mat, the information obtained from the measuring device relates to the quantity of water supplied into the watering mat, and the information received from the further measuring device relates to weather-related data;

documenting the received information; and generating control signals to control an output unit and a delivery device.

BRIEF DESCRIPTION OF THE SEVERAL VIEWS OF THE DRAWINGS

Embodiments of the invention are explained in more detail with the help of the following figures.

DETAILED DESCRIPTION

Figure 1:
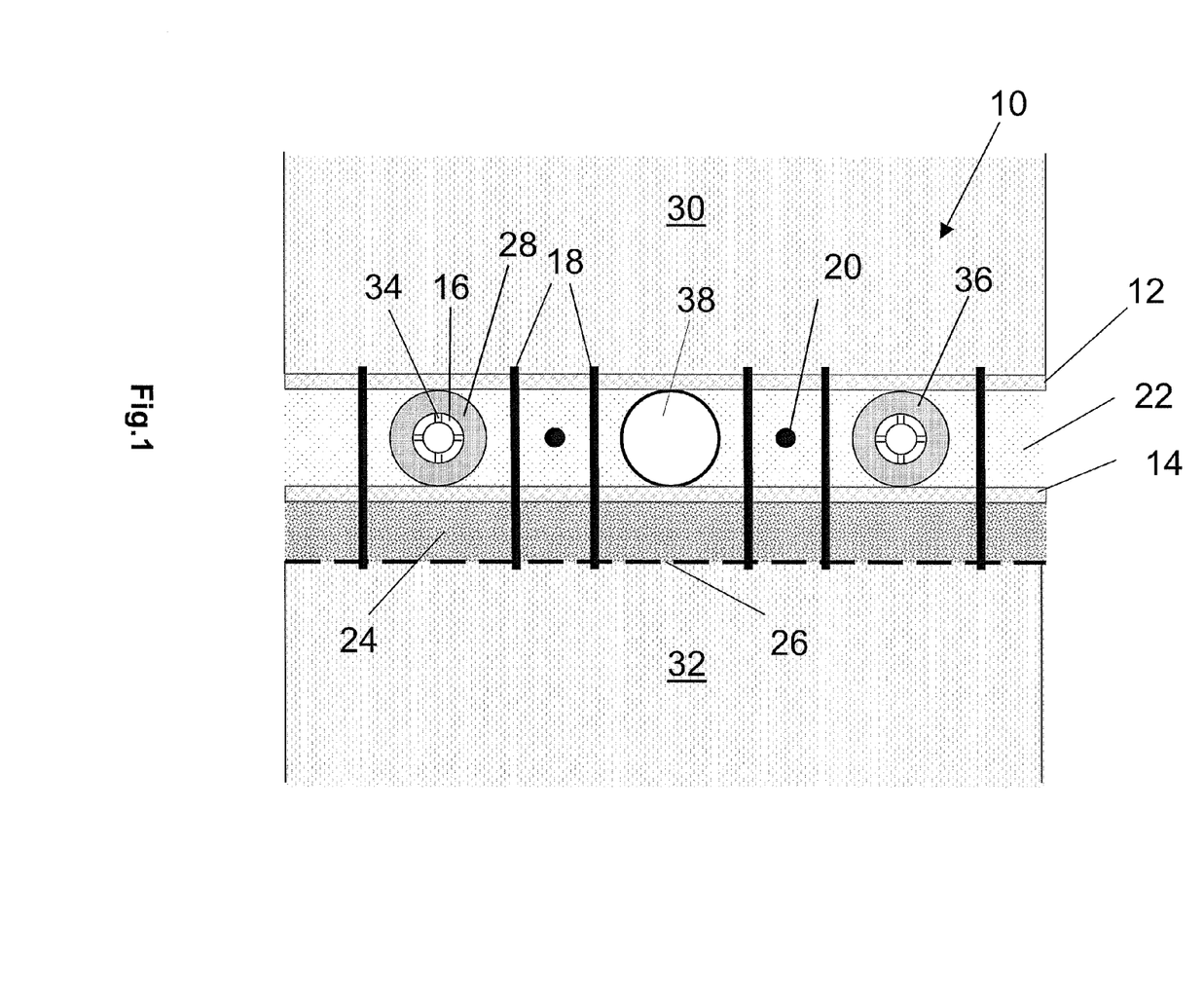
FIG. 1 shows a side view of a possible embodiment example of the present invention.

The watering mat 10 comprises one first and one second carrier layer 12 and 14, respectively, between which are arranged water-feeding elements 16. The water-feeding elements 16 possess perforations 34, may be arranged along the longitudinal or transverse direction, and may possess various diameters and cross-sectional shapes. However, for large mats of great length, it is practical to arrange the water-feeding elements 16 along the longitudinal direction in order to lower the pressure drop within the watering mat 10. The pressure drop can be further reduced by subdividing particularly sizeable watering mats 10 into several sections that are fed by different water-feeding elements 16. In this case, an individual water-feeding element 16 will possess perforations 34 only in the particular section of the watering mat 10 that it is intended to feed. In the remaining sections, it will not contain any perforations but rather only conduct the water through these sections. The pressure drop can also be reduced by providing different diameters within a water-feeding element 16. Subdividing the watering mat 10 into several sections does not necessitate any additional labor steps during installation.

The two carrier layers 12 and 14 are attached to each other by means of one or several connections 18. In the illustrated example, each of the connections 18 is located adjacent to the respective water-feeding elements 16. Also arranged between two connections 18 are means 20 in the form of sensor lines for detecting moisture level. These lines may either be embodied to directly detect the moisture level within the watering mat 10 (e.g., the lines can be considered moisture sensors themselves in one embodiment), or may represent, in an alternate embodiment, the cabling to several moisture sensors arranged uniformly across the entire watering mat 10. Also arranged between the first and the second carrier layer 12, 14, is an absorption layer 22, which serves as water storage. This absorption layer 22 can be embodied as an absorbent fiber bed, and additionally may contain superabsorbent polymers. The water-storage capacity of the absorption layer 22 is enhanced by both the superabsorbent polymers and the fiber bed. The illustrated watering mat 10 further comprises a capillary barrier 24. In the illustrated example, this barrier is formed from flexure-resistant fibers and/or textile scraps and is surrounded by a net-like structure 26 that keeps the fibers and/or textile scraps within a predefined space. In the illustrated embodiment example, the water-feeding element 16 is embodied in a linear shape with absorbent textile sheathing 28.

In the illustrated example gas-feeding elements 36 are provided in addition to the water-feeding element 16 in order to create the capability of introducing gas into the watering mat 10 in parallel to the introduction of water. In accordance with FIG. 1, the existing water-feeding elements 16 can also be used as gas feed, as desired, i.e., there are no differences between the design of the water-feeding elements 16 and the gas-feeding elements 36. A prerequisite for this is that the water-feeding elements 16 are suitable for feeding gas, i.e., consist of a gas-proof material, so that the gas can issue only from the intended locations and the water-feeding elements 16 can be connected to a gas-supply system. But the design may also be different, for example the absorbent textile sheathing 28 can be removed, if it was provided.

All of the elements shown in FIG. 1 are combined into one single constructional component, so that the watering mat 10 including all of these elements can be installed in a single work operation. Installing the watering mat 10 in the ground creates a first ground section 30 that is located above the watering mat 10 and a second ground section 32 that is located below the watering mat 10. In this case the plants (not illustrated) to be watered are located mainly in ground section 30. Alternatively, the watering mat 10 can be installed directly on the ground, i.e., above ground, and for example roll-out grass can be placed directly upon the carrier layer 12. Planters, for example, can be placed directly on the carrier layer 12, as is common practice in the cultivation of ornamental plants or in the planting of balconies. However, water evaporation in this case is higher than in a below-ground installation. The roots of the plants located in the ground region 30 can penetrate into the watering mat 10, and possibly even cross, depending on the model.

After the installation of the watering mat 10, the water-feeding elements 16 are connected to a water supply system (not illustrated). Subsequently water is fed into the watering mat 10, so that the water-feeding elements 16 are being filled with water. Via the perforations 34, the water enters into the absorbent textile sheathing 28, which effects a uniform distribution of the water over the entire length of the water-feeding elements 16. In order to ensure optimum water discharge, the perforations 34 can possess various diameters and shapes. From here, the absorption layer 22 will absorb water until it has reached its maximum absorption capacity, i.e., until it is completely charged with water. Any additional water that is supplied to the watering mat 10 is then discharged via the first and the second carrier layer 12, 14 to the adjacent ground regions 30 and 32. The carrier layers 12 and 14 may also be composed of water-conducting textiles, in particular webs of fleece material, so that they as well contribute to providing a more uniform water distribution across the entire watering mat 10. A uniform distribution of the water through the entire watering mat 10 is significant since it prevents or at least reduces the formation of zones with different moisture levels. Due to the characteristics of the terrain and soil, it is possible that some ground regions have higher water consumption than others. Accordingly, these zones withdraw more water from the watering mats than other zones. The water-conducting capability of the webs of fleece material ensures that water is transported to where it is needed. This reduces gradients of the moisture level within the watering mat 10.

As already explained above, the roots of plants in an early growth stage are initially exclusively found in the ground section 30. Consequently, supplying water to the ground section 32 is not practical. For this reason, the carrier layer 14 can be provided with a water-impermeable layer (not illustrated) instead of the capillary layer, in order to release the water supplied to the watering mat 10 exclusively into the ground section 30 and at the same time to prevent the ingress of water into the watering mat 10 from the ground section 32. Although the plant roots can penetrate into the watering mat 10, the water-impermeable layer prevents the plant roots from traversing the entirety of the watering mat 10.

In the illustrated example, the capillary barrier 24 is arranged below the second carrier layer 14. The capillary barrier 24 disrupts the capillary action of the ground, so that no water from the ground section 32 is able to reach the watering mat 10. The capillary barrier 24, however, is water permeable, so that the watering mat 10 also discharges water into the ground section 32. If the salt content of the soil is very high and no capillary barrier 24 were present, salt would accumulate in the watering mat 10, which could result in a blocking of the perforations 34 and thus an impairment of the operating capability of the watering mat 10. Furthermore, the deposited salt could dissolve in the supplied water, which would result in water with an elevated salt content being supplied to the plants, which could damage the plants. In contrast to the embodiment variant in which a water-impermeable layer is provided on the carrier layer 14, the plant roots can cross the watering mat 10 all the way.

Means 20 for detecting the moisture level are provided for the purpose of maintaining the moisture level of the watering mat 10 in an optimum range. The means 20 are embodied in such a way that they can quantify the moisture level and ideally can output the moisture level in electronically recordable form. The means may be connected to a control or feedback control unit 50 (compare FIG. 2), which controls the supply of water into the watering mat 10 in accordance with the determined moisture level by activating a delivery device 40 (compare FIG. 2) such as a pump. Alternatively it is possible that the means 20 only display the moisture level by means of an output unit 46 (compare FIG. 2) and optionally issue a warning, e.g., in optic, acoustic, or haptic form, so that the water supply can be increased or decreased manually until the moisture level again is in its optimum range. In this manner, supplying too much water into the watering mat 10 can be avoided, which would also supply the ground section 30 with more water than the plants need. This would result in water accumulation in the ground section 30 (water logged soil), which could lead to plant rot. This also avoids not enough water from being supplied to the ground section 30, which could lead to a drying out of the plants.

The absorption layer 22 serves as a buffer to compensate for variations in both the water supply into the watering mat 10 as well as water withdrawal by the ground region 30. If for example for an extended time period no water is fed into the watering mat 10 and at the same time the moisture level of the ground section 30 decreases due to a dry spell, the ground section 30 will withdraw moisture from the absorption layer 22, so that the moisture level of the absorption layer 22 drops below its saturation limit. Moisture can be withdrawn from the watering mat 10 until no more water is contained in the absorption layer 22 or until the remaining water present is retained so strongly that the capillary forces of the ground section 30 or of the plant roots are not sufficient to withdraw it from the absorption layer 22. If the absorption layer 22 consists of superabsorbent polymers, which can store an amount of water corresponding to 100 to 1000 times their own weight, it becomes possible to store enough water in the watering mat 10 to at least partially overcome a dry spell.

The watering mat 10 illustrated in FIG. 1 additionally is provided with an empty pipe 38. Both the position of the empty pipe as well as the number of empty pipes can be chosen freely. Empty pipes are of particular advantage when the configuration of the watering mat 10 is to be changed. For example if it is discovered—contrary to earlier estimates—that the quantity of water that can be introduced into the watering mat is not sufficient to provide a lasting irrigation of the ground, it is possible to install additional water-feeding elements without much effort. The empty pipes further can be embodied in a way so that they allow the subsequent installation of sensor lines into the watering mat 10. The replacement of existing sensor lines could prove to be problematic if the existing sensor lines have been cut at various locations within the watering mat 10, e.g., due to improper installation, and can no longer be removed completely. The empty pipe 38 can also be used for sensor lines that will be used to measure quantities that have been found to be relevant only during the course of operation of the watering mat.

Figure 2:
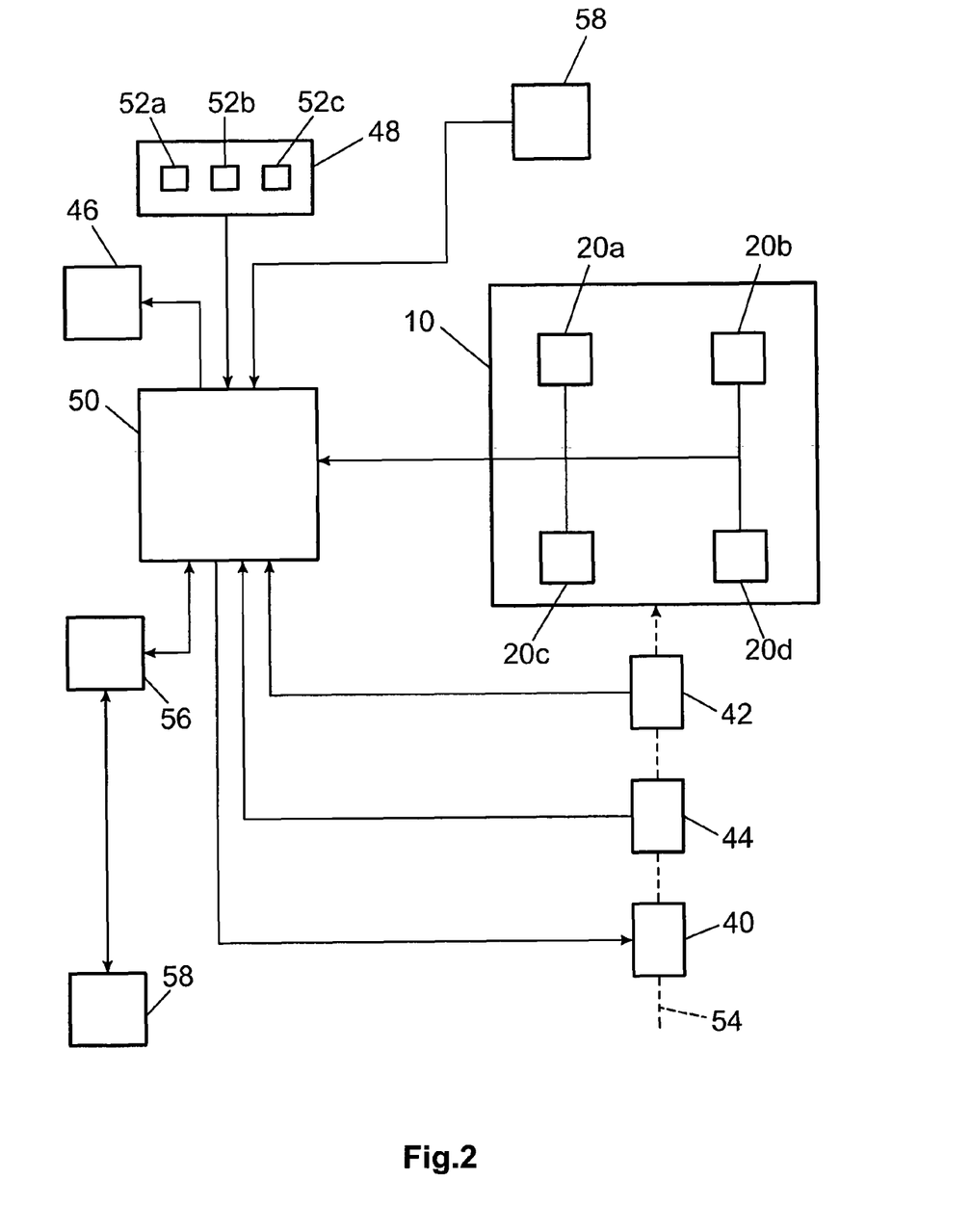
FIG. 2 shows an advantageous embodiment variant of an irrigation system according to the invention.

FIG. 2 illustrates an advantageous variant of the irrigation system according to some embodiments of the invention. The irrigation system comprises the watering mat 10, which is equipped with means 20a, 20b, 20c and 20d for detecting the moisture level in the watering mat 10. Water is fed into the watering mat by way of a water line 54 with the assistance of a delivery device 40. The water line 54 contains a measuring apparatus 42 to determine the salt content of the supplied water and a measuring device 44 for determining the quantity of supplied water. The irrigation system further comprises a control unit 50, which is connected with an input unit 58, a measuring device 48, an output unit 46, and a transmission unit 56 via corresponding lines.

During operation of the irrigation system, information relating to the operation of the watering mat 10 is input into the control unit via the input unit 58. In the simplest scenario, this information could indicate that the watering mat 10 is to commence or cease operation. The control unit receives information regarding the moisture level in the watering mat 10. For this purpose, means 20a-d are provided. Since, as described above, the water is distributed uniformly though the watering mat 10, it is not necessary to measure the moisture level throughout the entire watering mat 10. In the illustrated example, the means 20a-d are arranged in several sections—four in this case—of the watering mat 10, but it could be advantageous to use a different number of sections, in particular if the water withdrawals within the ground sections to be watered can be expected to vary widely.

The measuring apparatus 42 provides measurement data to the control unit 50 relating to the salt content of the supplied water. As described above, depending on the employed measuring method, the determination of the moisture level in the watering mat 10 may be dependent upon the salt content of the supplied water. In this embodiment variant of the irrigation system, the control unit 50 can perform automatic corrections of the information, which is received from the means 20 and relates to the salt content of the supplied water, so that the moisture level can be determined very precisely.

The control unit 50 drives the delivery device 40 in accordance with the determined moisture level. The conditions for this can be formulated via the input unit 58. For example, it can be specified to supply water when the moisture level drops below a certain value. The measuring device 44 measures the water volume that is actually supplied to the watering mat 10. Thus it can be determined how the moisture level reacts to the supply of water. This for example allows determining the water volume that is necessary to increase the moisture level by a specific value. This further allows making a prediction of the time lag of the watering mat 10, i.e., how quickly the moisture level reacts to a supply of water.

The control unit 50 is also connected to an output unit 46. The output unit may be a monitor or a warning display. Criteria on when a warning is to be issued can be specified via the input unit 58. For example, it can be specified that a warning be issued if the moisture level for a specified time period is below or above a certain value. This could be an indication that the irrigation system is not functioning properly and an inspection is called for.

Also provided is a further measuring device 48, which measures weather-related data and relays the data to the control unit 50 for documentation and processing. In the illustrated example, the measuring device 48 comprises three sensors 52a, 52b and 52c, which measure temperature, air humidity, and brightness. Additional sensors may be provided. The records of the weather-related data are used to find in an empirical manner a dependence of the moisture level in the watering mat 10 on the weather-related data. The goal is to be able to predict the reaction of the watering mat 10 to changes in the weather-related data, i.e., to create a mathematical model, so that measuring the moisture level in the watering mat 10 will no longer be necessary.

For example, if the air temperature above the watering mat 10 is measured and compared to the moisture level, it is possible to determine a correlation. As the temperature rises, it is to be expected for the moisture level in the watering mat 10 to drop, so that the appropriate water supply can be initiated. However, temperature information on its own may not be sufficient to be able to make reliable predictions of the moisture level to be expected. Integrating the temperature over time (by means of a computer) yields a specific heat input into the soil and into the watering mat 10, which may be better suited to determine the moisture level. Since the moisture level in the watering mat 10 is dependent on evaporation of water present in the ground, taking into account air humidity can render the prediction of the moisture level more reliable. Brightness, which represents a measure of incident solar radiation, may also affect the moisture level, just as the wind can (wind direction, strength, duration). Furthermore, the soil characteristics (sandy soil retains moisture differently than clay soil), the ground depth at which the watering mat is installed, as well as the type of plant to be watered, can affect the moisture level. However, these variables (soil characteristics, installation depth, type of plants) are not time-dependent and therefore only have to be taken into consideration once.

The irrigation system further comprises the transmission unit 56, which can transmit to the receiving station 58 all of the data that were supplied to and are documented by the control unit 50 as well as the control signals generated by the control unit 50. Transmission can be effected in any suitable manner, whereby an Internet connection seems to be most practical. In this, the receiving station 58 can be located with the operator and/or with the manufacturer of the irrigation system. In this manner, the operation of the irrigation system can be monitored online and critical operating conditions can be immediately recognized. This creates a capability for remote diagnostics for fault correction, or allows the operator and/or the manufacturer to travel with selected qualified personnel directly to the irrigation system without having to spend much time locating the fault. Service and maintenance become significantly simpler in this manner.

The fact that all of the operational data is being documented makes it easier to clarify the issue of responsibility in a liability case. If for example, the manufacturer can prove that despite repeated requests no changes in the operation of the irrigation system were initiated, liability will rest with the operator and not the manufacturer.

The documenting feature also creates the option of awarding a seal of quality to operators that operate the irrigation system in an exemplary and reliable manner. In this manner the manufacturer can improve the quality of his operators as well as the safety and reliability of his irrigation systems. Furthermore, a customer can be provided with a guarantee that if the irrigation system is operated in a demonstrably professional manner by operators carrying the seal of quality, a specific result can be achieved, for example a specific level of water savings for the same harvest yield, or an improvement of the lawn quality, or an irrigation system functioning fault-free for a certain time period. One of the conditions of such a guarantee may be that constructional measures in the ground section 30 can only be performed after an earlier determination of the position of the appropriately designed feed elements and/or the means 20 with the help of a detector that has been certified or rated as suitable by the manufacturer.

The above-described aspect of modeling is further aided by the option of transmitting the relevant operating data. For example, the manufacturer can document the relevant operating data from all of the installed irrigation systems and can use them for modeling. It becomes possible to use operating data for this that were generated under completely different conditions and in different regions of the world. The developed model in this case rests upon a very wide data basis, which improves the quality of the developed model.

The invention has been explained with the help of an embodiment example, whereby this explanation is not to be considered complete and final. Any changes and modifications that are not described here but are obvious to a person skilled in the art will not deviate from the principal idea that the invention is based on. For example, the carrier layers of the watering mat may be connected to each other in a different manner than the one described. Further, feed elements may be oriented in various directions and may be arranged in several absorption layers. The water-feeding elements are not limited to feeding water. In principle they can be used to feed any imaginable fluid, however the fluids envisioned by various embodiments of the invention are those that promote plant growth. For the predominant part this will be water, which however may be enriched with growth-stimulating additives. These may be nutrients, trace elements, vitamins, etc. At the same time, the water may be enriched with gases such as oxygen. The irrigation system may also comprise further sensors that increase the safety and reliability of the operation of the watering mat. Also envisioned can be sensors that measure the viscosity of the supplied water, which can be particularly relevant if growth-stimulating substances are admixed. Too high a viscosity can impede the discharge into the ground region.

A further embodiment of the present invention is based on that the watering mat not only consists of two carrier layers, namely a first one, located on top, and a second one, located at the bottom, but rather that these two carrier layers differ with respect to their water-absorption capacity or water-storage capacity. The water-absorption capacity, i.e., the water-storage capacity, of the upper carrier layer is greater than the water-absorption capacity of the lower carrier layer.

It is also conceivable to reverse the ratio of the greater/lesser water-storage capacity, but trials have shown that it is more practical for the upper carrier layer to have a higher water-storage capacity than the lower carrier layer.

The lower carrier layer preferably consists of a plastic material, e.g., up to approximately 50 to 80% of polypropylene and approximately 20 to 50% of a polyacrylate material, whereby the preferred storage capacity (absorption capacity) in this case is approximately 0.5 to 2 liters of water per $m^2$.

The upper carrier layer preferably consists of at least three materials, namely polypropylene, polyethylene and viscose, whereby the constituent portion of polypropylene is in a range of 30 to 50%, the constituent portion of polyethylene in a range between 15 to 40%, and the constituent portion of viscose in a range between 10 to 45%. The storage capacity of this carrier layer should be approximately 1.2 to 5 liters of water per $m^2$, whereby the actual water-storing capacity can be variable and can be increased particularly by a higher proportion of viscose.

The particular storage capacity to be adjusted for individual cases is predominantly dependent upon the plants to be grown, but also on the soil material that is employed on the watering mat according to various embodiments of the invention. For example, it is practical that with soil material that by nature possesses a lower water-storage capacity, the watering mat contain a higher storage capacity, whereas with a soil material that has a higher water-storage capacity by nature, the mat itself can have a lower water-storage capacity.

Further, it is particularly advantageous if the watering mat according to some embodiments of the invention is equipped with a measuring device for measuring the salt content of the water/humidity in the soil. This measuring device can consist of an electrical-conductance-measuring device, which measures the electrical conductivity of the water or of the moisture or of the soil in the area of the watering mat. The measuring device itself can be arranged between the two carrier layers of the watering mat or below or above the watering mat.

Finally, according to some embodiments of the invention, earth material may be arranged between the two carrier layers, e.g., a clay or a loam layer or similar, i.e., a material that on the one hand has the capacity of storing water and on the other hand also has a mineral content, in order to compensate for any possible mineral deficiencies in the existing soil material.

The invention claimed is:

1. An irrigation system comprising:
    a watering mat for the large-area distribution of water installed below-ground with a first ground section located above the watering mat and a second ground section located below the watering mat so that plant roots of plants located in the first ground section can penetrate into the watering mat, the watering mat comprising:
        a first carrier layer and a second carrier layer that are positioned between the first ground section and the second ground section;
        one or more connections for connecting the first and the second carrier layers;
        one or more water-feeding elements arranged between the first and the second carrier layers for feeding water into the watering mat and distributing the water in the watering mat;
        an absorption layer for water storage arranged between the first and the second carrier layers;
        a moisture level detector arranged in the watering mat between the first carrier layer and the second carrier layer; and
        a capillary barrier to prevent salt accumulation in the watering mat, the capillary barrier being arranged below the second carrier layer and being attached to the watering mat using the one or more connections;
    a delivery device to deliver water into the watering mat;
    a measuring apparatus for determining the salt content of the water supplied to the watering mat;
    a measuring device for determining the water volume supplied to the watering mat;
    a further measuring device comprising a temperature sensor, an air humidity sensor and a brightness sensor for measuring weather-related data;
    an output unit to output information related to the moisture level in the watering mat, the salt content of water supplied to the watering mat and weather-related data; and
    a control unit configured to process data received from the moisture level detector, the measuring apparatus, the measuring device, and the further measuring device, and to generate a control signal for driving the output unit and the delivery device, the control unit being further configured to issue a warning if the moisture level in the watering mat for a specified time period is below or above a certain value, indicating that the irrigation system is not functioning properly.

2. The irrigation system of claim 1 wherein the moisture level detector of the watering mat comprises sensor lines.

3. The irrigation system of claim 1 wherein the moisture level detector of the watering mat comprises moisture sensors and associated cabling.

4. The irrigation system of claim 1 wherein the first and second carrier layers of the watering mat are constructed of textiles.

5. The irrigation system of claim 1 wherein the one or more connections are seam connections.

6. The irrigation system of claim 1 wherein the absorption layer of the watering mat comprises an absorbent fiber bed.

7. The irrigation system of claim 1 wherein the absorption layer of the watering mat contains superabsorbent polymers to enhance the water-storing capacity.

8. The irrigation system of claim 1 wherein the one or more water-feeding elements of the watering mat comprise a flat hose.

9. The irrigation system of claim 1 wherein the one or more water-feeding elements of the watering mat comprise a perforated irrigation hose or soaker hose adapted to connect to a water supply system.

10. The irrigation system of claim 1 wherein the one or more water-feeding elements of the watering mat include a filter for the discharge of water.

11. The irrigation system of claim 1 wherein the one or more water-feeding elements of the watering mat include absorbent textile sheathing.

12. The irrigation system of claim 1 wherein at least one of the water-feeding elements and the moisture level detector of the watering mat comprise a material that is detectable using a detector.

13. The irrigation system of claim 1 wherein filler strips are provided for the lateral immobilization of the water-feeding elements of the watering mat between the first and the second carrier layers and as height adjustment between the water-feeding elements and the first and the second carrier layers.

14. The irrigation system of claim 1 wherein the second carrier layer of the watering mat has a water-impermeable outside surface.

15. The irrigation system of claim 1 wherein the capillary barrier is a root-anchoring mat.

16. The irrigation system of claim 1 wherein the one or more water-feeding elements of the watering mat are adapted for feeding gases into the watering mat.

17. The irrigation system of claim 1, wherein the watering mat further comprises gas-feeding elements for feeding gas into the watering mat.

18. The irrigation system of claim 1, wherein the watering mat further comprises empty pipes for changing the configuration of the watering mat.

19. A method for the more efficient use of water employed in the irrigation of ground sections, the method comprising:
large-area distribution of water via the watering mat of claim 1;
inputting information relating to the operation of the watering mat via an input unit;
detecting the moisture level in the watering mat with the moisture level detector that is arranged between the first carrier layer and the second carrier layer;
feeding water into the watering mat via the delivery device;
determining the salt content of the water supplied to the watering mat via the measuring apparatus;
determining the volume of water supplied to the watering mat via the measuring device;
measuring weather-related data via the further measuring device;
documenting and processing data received from the moisture level detector, the measuring apparatus, the measuring device, and the further measuring device, via the control unit;
generating control signals for controlling the output unit and the delivery device via the control unit;
transmitting to a receiving station data received by the control unit for documenting and processing purposes from the moisture level detector, the measuring apparatus, the measuring device, and the further measuring device; and
issuing the warning when the detected moisture level in the watering mat is below or above the certain value for the specified period of time to provide the indication that the watering mat is not functioning properly.

20. The irrigation system of claim 1 wherein the first carrier layer of the watering mat is arranged above the second carrier layer, the first and second carrier layers consist of different materials, the first and second carrier layers differ with respect to water-absorption capacity, and the water-absorption capacity of the first carrier layer is greater than the water-absorption capacity of the second carrier layer.

21. The irrigation system of claim 20 wherein the water-absorption capacity of the first carrier layer is approximately 1.3 to 5 liters of water per $m^2$.

22. The irrigation system of claim 20 wherein the water-absorption capacity of the second carrier layer is approximately 0.6 to 2 liters of water per $m^2$.

23. The irrigation system of claim 20 wherein the second carrier layer consists of approximately 70% of a polypropylene material and of approximately 30% of a polyacrylate material.

24. The irrigation system of claim 20 wherein the first carrier layer consists of approximately up to 40% of a polypropylene material, up to approximately 30% of a polyethylene material, and up to approximately 30% of a viscose material.

25. The irrigation system of claim 20 wherein between the first and the second carrier layers of the watering mat is arranged a natural material with a layer thickness of approximately 1 to 10 cm.

26. An irrigation system comprising:
a watering mat for the large-area distribution of water installed below-ground with a first ground section located above the watering mat and a second ground section located below the watering mat so that plant roots of plants located in the first ground section can penetrate into the watering mat, the watering mat comprising:
a first carrier layer and a second carrier layer that are positioned between the first ground section and the second ground section;
one or more connections for connecting the first and the second carrier layers;
one or more water-feeding elements arranged between the first and the second carrier layers for feeding water into the watering mat and distributing the water in the watering mat;
an absorption layer for water storage arranged between the first and the second carrier layers;
a moisture level detector arranged in the watering mat between the first carrier layer and the second carrier layer; and
a capillary barrier to prevent salt accumulation in the watering mat, the capillary barrier including at least one of flexure-resistant fibers and textile scraps and being enveloped by a net structure;
a delivery device to deliver water into the watering mat;
a measuring apparatus for determining the salt content of the water supplied to the watering mat;
a measuring device for determining the water volume supplied to the watering mat;
a further measuring device comprising a temperature sensor, an air humidity sensor and a brightness sensor for measuring weather-related data;
an output unit to output information related to the moisture level in the watering mat, the salt content of water supplied to the watering mat and weather-related data; and
a control unit configured to process data received from the moisture level detector, the measuring apparatus, the measuring device, and the further measuring device, and to generate a control signal for driving the output unit and the delivery device, the control unit being further configured to issue a warning if the moisture level in the watering mat for a specified time period is below or above a certain value, indicating that the irrigation system is not functioning properly.

27. An irrigation system for a more efficient use of the water employed for watering ground sections, the irrigation system comprising:
a watering mat for the large-area distribution of water having a first carrier layer and a second carrier layer, the watering mat installed below-ground with a first ground section located above the watering mat and a second ground section located below the watering mat so that plant roots of plants located in the first ground section can penetrate into the watering mat, the watering mat including means for detecting the moisture level in the watering mat arranged between the first carrier layer and the second carrier layer and further including a capillary barrier to prevent salt accumulation in the watering mat which is arranged below the second carrier layer and attached to the first carrier layer and the second carrier layer using one or more connections;

an input unit to input information relating to the operation of the watering mat;

a delivery device to deliver water into the watering mat;

a measuring apparatus for determining the salt content of the water supplied to the watering mat;

a measuring device for determining the water volume supplied to the watering mat;

a further measuring device comprising a temperature sensor, an air humidity sensor and a brightness sensor for measuring weather-related data;

an output unit to output information related to the moisture level in the watering mat, the salt content of water supplied to the watering mat and weather-related data;

a control unit for documenting and processing the data received from the detector means, the measuring apparatus, the measuring device, and the further measuring device, and for generating a control signal for driving the output unit and the delivery device; and a transmission unit to transmit to a receiving station the data received by the control unit for documenting and processing purposes from the detector means, the measuring apparatus, the measuring device, and the further measuring device, and the control signals generated by the control unit for driving the output unit and the delivery device, and wherein the control unit includes information from the input unit that includes criteria establishing that a warning is to be issued if the moisture level in the watering mat for a specified time period is below or above a certain value, indicating that the irrigation system is not functioning properly.

28. An irrigation system, comprising:

a watering mat installed below-ground with a first ground section located above the watering mat and a second ground section located below the watering mat so that plant roots of plants located in the first ground section can penetrate into the watering mat, the watering mat including a first carrier layer, a second carrier layer connected to the first carrier layer, a water-feeding element between the first and the second carrier layers configured to feed water into the watering mat and distribute the water in the watering mat, an absorption layer between the first and the second carrier layers, a moisture level detector between the first and the second carrier layers, and a capillary barrier to prevent salt accumulation which is arranged below the second carrier layer and attached to the first carrier layer and the second carrier layer using one or more connections;

a delivery device to deliver water into the watering mat;

a measuring apparatus for determining the salt content of the water supplied to the watering mat;

a measuring device for determining the water volume supplied to the watering mat;

a further measuring device comprising a temperature sensor, an air humidity sensor and a brightness sensor for measuring weather-related data;

an output unit to output information related to the moisture level in the watering mat, the salt content of water supplied to the watering mat and weather-related data; and a control unit configured to process data received from the moisture level detector, the measuring apparatus, the measuring device, and the further measuring device, and to generate a control signal for driving the output unit and the delivery device, the control unit being further configured to issue a warning if the moisture level in the watering mat for a specified time period is below or above a certain value, indicating that the irrigation system is not functioning properly.

* * * * *